United States Patent
Lebrato-Rastrojo et al.

(10) Patent No.: US 12,017,717 B2
(45) Date of Patent: Jun. 25, 2024

(54) ASSEMBLY SYSTEM FOR AUTOMOTIVE LAMPS AND AN OPERATING METHOD THEREOF

(71) Applicant: Hella GmbH & Co. KGaA, Lippstadt (DE)

(72) Inventors: Miguel Lebrato-Rastrojo, Paderborn (DE); Thomas Albert Röbbecke, Erwitte (DE); Ingo Engler, Soest (DE); Petr Chladek, Lippstadt (DE); Frantisek Jane, Lippstadt (DE); Jun Yue, Jiaxing (CN); Tao Hu, Jiaxing (CN); Wei Hu, Jiaxing (CN)

(73) Assignee: Hella GmbH & Co. KGaA, Lippstadt (DE)

(*) Notice: Subject to any disclaimer, the term of this patent is extended or adjusted under 35 U.S.C. 154(b) by 323 days.

(21) Appl. No.: 17/206,223

(22) Filed: Mar. 19, 2021

(65) Prior Publication Data

US 2021/0206440 A1 Jul. 8, 2021

Related U.S. Application Data

(63) Continuation of application No. PCT/CN2018/125362, filed on Dec. 29, 2018.

(51) Int. Cl.
*B62D 65/16* (2006.01)
*B23P 21/00* (2006.01)
*G05B 19/418* (2006.01)

(52) U.S. Cl.
CPC .......... *B62D 65/16* (2013.01); *B23P 21/004* (2013.01); *B23P 21/006* (2013.01); *G05B 19/41805* (2013.01); *G05B 19/41815* (2013.01); *B23P 2700/50* (2013.01)

(58) Field of Classification Search
CPC ........ B23P 21/004–006; B23P 2700/50; B62D 65/02; B62D 65/022; B62D 65/024; B62D 65/16
See application file for complete search history.

(56) References Cited

U.S. PATENT DOCUMENTS

| | | | |
|---|---|---|---|
| 2021/0197385 A1* | 7/2021 | Gruene | B25J 11/005 |
| 2021/0206441 A1* | 7/2021 | Lebrato-Rastrojo | B23P 21/004 |

FOREIGN PATENT DOCUMENTS

| | | |
|---|---|---|
| CN | 203409492 U | 1/2014 |
| CN | 204771514 U | 11/2015 |
| CN | 107042408 A | 8/2017 |
| CN | 107504031 A | 12/2017 |
| CN | 206811469 U | 12/2017 |
| JP | 2001121364 A | 5/2001 |

OTHER PUBLICATIONS

Translation of CN107504031 (Year: 2017).*
Translation of CN206811469 (Year: 2017).*

* cited by examiner

*Primary Examiner* — Matthew P Travers
(74) *Attorney, Agent, or Firm* — Hella GmbH & Co. KGaA

(57) ABSTRACT

An assembly system is provided for automotive lamps and an operation method thereof. In the invention, three kinds of function robots are responsible for the transmission work of the workpieces among various functional stations, which realizes automatic coating, fastening, and whole lamp performance testing, etc. Meanwhile, the invention provides an assembly system with a bilateral assembly line operating simultaneously.

4 Claims, 3 Drawing Sheets

ASSEMBLY SYSTEM FOR AUTOMOTIVE LAMPS AND AN OPERATING METHOD THEREOF

CROSS REFERENCE

This application is a continuation of and claims priority to PCT Application No. PCT/CN2018/125362, filed Dec. 29, 2018, which itself claims priority to Chinese application No. 201811100068.1, filed Sep. 20, 2018, the entireties of both of which are hereby incorporated by reference.

FIELD OF THE INVENTION

The present invention relates to the technical field of automotive lamp manufacture and, more particularly, to an assembly system for automotive lamps and an operation method thereof.

BACKGROUND

With the development of science and technology, the automotive industry is also rapidly advancing and more and more requirements are put forward to automobile performance, and the functionality, appearance and cost performance of automobiles are the evaluation factors for purchasing and using automobiles. As lighting devices for automobiles, automotive lamps also achieve decorative effects on automobiles and draw more and more attention. However, the assembly of automotive lamps directly affects the lifespan and performance thereof.

Traditional assembly of lamp lens and lamp housing of an automotive headlamp mainly includes gluing, optical testing and lamp sealing performance testing, but each of the above processes works separately, and requires a large number of workers to carry and transport the workpieces, and this results in a long waiting time between processing steps, low process integration and high processing costs.

SUMMARY OF THE INVENTION

In order to solve the above problems, the present invention provides an assembly system for automotive lamps and an operation method thereof. The assembly system uses three kinds of functional robots responsible for transmission of workpieces between various functional stations to realize automatic gluing, fastening and whole lamp performance testing, etc, thereby reducing the amount of manual intervention and improving process integration. By providing a reasonable turnover area, the problem associated with waiting time caused by transmission rate differences between processes is regulated. Meanwhile, an assembly system with a two-sided assembly line operating simultaneously is provided, which greatly improves the working efficiency of the assembly system.

Specifically, an aspect of the present invention provides an assembly system for automotive lamps, the assembly system comprising: a glue-robot, a lamp housing transport and fastening station, a lamp lens transport station, a whole lamp turnover station, a first optical test station, a second optical test station, a whole lamp sealing performance test station, a whole lamp transport station—which are disposed sequentially; a lamp lens carrying robot; and a whole lamp carrying robot; wherein: the lamp housing transport and fastening station, the lamp lens transport station and the whole lamp turnover station are located in the working area of the lamp lens carrying robot; the whole lamp turnover station, the first optical test station, the second optical test station, the whole lamp sealing performance test station and the whole lamp transport station are located in the working area of the whole lamp carrying robot.

Preferably, a glue dispensing gun and a plasma processing unit are disposed on the glue-robot.

Preferably, a nail gun and a positioning fixture are disposed at the lamp housing transport station, wherein the positioning fixture comprises a housing fixture and a locating pin.

Preferably, the whole lamp turnover station includes a workpiece platform, the workpiece platform includes at least one loading position or unloading position, and the workpiece platform rotates at a preset rate.

Preferably, the assembly system includes a gluing machine, the gluing machine being disposed at the front of the glue-robot.

In another aspect, the present invention provides an assembly system for automotive lamps comprising a first assembly line and a second assembly line, wherein: each of the first assembly line and the second assembly line includes the assembly system as defined above; and the first assembly line and the second assembly line are symmetrical.

Preferably, the first assembly line and the second assembly line alternately share one lamp lens carrying robot.

In another aspect, the present invention provides a method for operating the assembly system for automotive lamps, the method comprising the following steps: the lamp housing transport and fastening station transports an automotive lamp housing to be processed to a processing location, the glue-robot dispenses glue to the lamp housing; the lamp lens transport station transports a lamp lens to be processed to a processing location, the lamp lens carrying robot carries the lamp housing from the lamp lens transport station to the upper of the lamp housing at the lamp housing transport and fastening station, and fastens the lamp lens to the lamp housing; the lamp housing transport and fastening station fixedly connects the lamp housing and the lamp lens to form a whole lamp; the lamp lens carrying robot carries the whole lamp to the whole lamp turnover station; the whole lamp carrying robot carries the whole lamp from the whole lamp turnover station to the first optical test station or the second optical test station; the first optical test station or the second optical test station conducts an optical test and adjustment for the whole lamp; the whole lamp carrying robot carries the whole lamp from the first optical test station or the second optical test station to the whole lamp sealing performance test station; the whole lamp sealing performance test station conducts a sealing performance test on the whole lamp; the whole lamp carrying robot carries the whole lamp from the lamp sealing performance station to the whole lamp transport station, and the whole lamp waits to be unloaded here.

Preferably, the step of the whole lamp carrying robot carrying the whole lamp from the whole lamp turnover station to the first optical test station or the second optical test station includes: the whole lamp carrying robot detects whether a whole lamp is already present in the first optical test station or the second optical test station, and places a new whole lamp to the first optical test station or the second optical test station without a whole lamp.

Preferably, the step of the glue-robot dispensing glue to the lamp housing includes: the plasma processing unit on the glue-robot moves according to a preset route and performs surface treatment on the glue groove of the lamp housing;

the glue dispensing gun on the glue-robot moves according to a preset route to fill glue into the glue groove of the lamp housing.

Preferably, the step of the lamp housing transport station fixedly connecting the lamp housing and the lamp lens to form a whole lamp includes: a nail gun at the lamp housing transport station shoots nails into the preset positions of the fastened lamp housing and lamp lens to fixedly connect the lamp housing and the lamp lens.

Preferably, after the lamp housing is placed at the lamp housing transport station, the lamp housing is fixed by the housing fixture at the lamp housing transport station, and the locating pin of the positioning fixture is placed under the housing fixture to restrict the lamp housing.

Preferably, the workpiece platform at the whole lamp turnover station rotates at a preset rate; the lamp lens carrying robot carries the whole lamp to the loading position of the whole lamp turnover station at a first frequency; the whole lamp carrying robot carries the whole lamp from the unloading position of the whole lamp turnover station to the first optical test station or the second optical test station at a second frequency.

Preferably, a gluing machine is disposed at the front of the glue-robot, and the gluing machine fills glue into the glue-robot regularly.

In another aspect, the present invention provides another operation method of the assembly system for automotive lamps, wherein: the assembly system includes a first assembly line and a second assembly line; the first assembly line and the second assembly line are symmetrical, and both operate according to the operation method as defined above.

Preferably, the first assembly line and the second assembly line share one lamp lens carrying robot, with the lamp lens carrying robot carrying out works alternately between the first assembly line and the second assembly line.

Compared with the prior art, the advantages of the present invention are:

(1) It uses three kinds of functional robots responsible for transmission of workpieces between various functional stations.
(2) It realizes automatic gluing, fastening and whole lamp performance testing, thereby reducing the amount of manual intervention and improving process integration.
(3) It provides a whole lamp turnover station and a whole lamp transport station, reasonably adjusting the waiting time caused by transmission rate differences between processes.
(4) It further provides a two-sided assembly line operating simultaneously to significantly improve the working efficiency of the assembly system.

BRIEF DESCRIPTION OF THE DRAWINGS

Reference is now made more particularly to the drawings, which illustrate the best presently known mode of carrying out the invention and wherein similar reference characters indicate the same parts throughout the views.

REFERENCE NUMBERS

1—glue-robot,
2—mask carrying robot,
3—whole lamp carrying robot,
11—shell transport and fix station,
12—mask transport station,
13—whole lamp turnover station,
14—first optical test position,
15—second optical test station,
16—whole lamp sealing performance test station,
17—whole lamp transport station,
18—glue machine.

DETAILED DESCRIPTION OF THE DRAWINGS

The advantages of the present invention are explained in detail below with reference to the accompanying drawings and specific embodiments.

Figure 1:
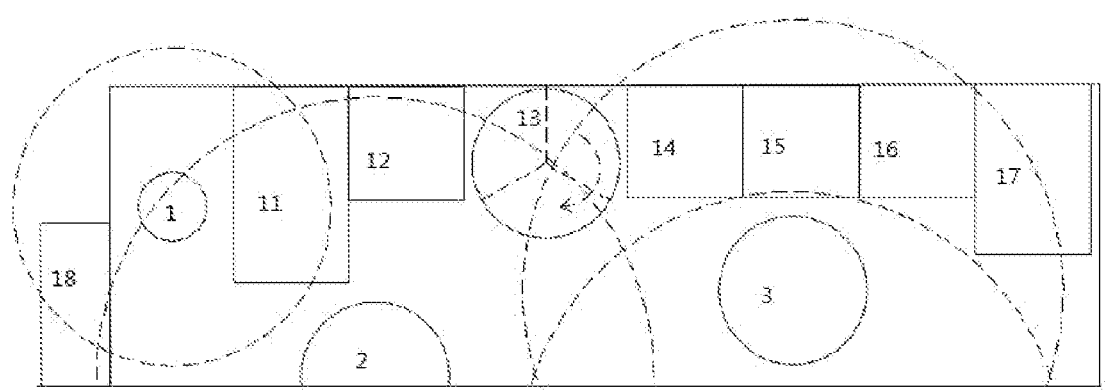
FIG. 1 is a schematic view showing the structure of an assembly system for an automotive lamp in accordance with a preferred embodiment of the present invention.

Referring to FIG. 1 which is a schematic structural view of an assembly system for automotive lamps. As can be seen from the figure, the assembly system of this embodiment primarily comprises: a lamp housing transport and fastening station 11, a lamp lens transport station 12, a whole lamp turnover station 13, a first optical test position 14, a second optical test station 15, a whole lamp sealing performance test station 16, and a whole lamp transport station 17, all the stations can be disposed sequentially. In addition, a glue-robot 1 is disposed at a position near the lamp housing transport and fastening station 11; a lamp lens carrying robot 2 is disposed close to the lamp housing transport and fastening station 11, the lamp lens transport station 12 and the whole lamp turnover station 13. Also, a whole lamp carrying robot 3 is disposed at a position close to the whole lamp turnover station 13, the first optical test position 14, the second optical test station 15, the whole lamp sealing performance test station 16 and the whole lamp transport station 17. In view of the said arrangement, the glue-robot 1 can dispense glue to the automotive lamp placed at the lamp housing transport and fastening station 11; the lamp lens carrying robot 2 can perform transportation of lamp lens between the lamp housing transport and fastening station 11 and the lamp lens transport station 12, and transportation of assembled whole lamp between the lamp housing transport and fastening station 11 and the whole lamp turnover station 13; and the whole lamp carrying robot 3 can transport whole lamp between the first optical test station 14, the second optical test station 15, the whole lamp sealing performance test station 16 and the whole lamp transport station 17.

Figure 2:
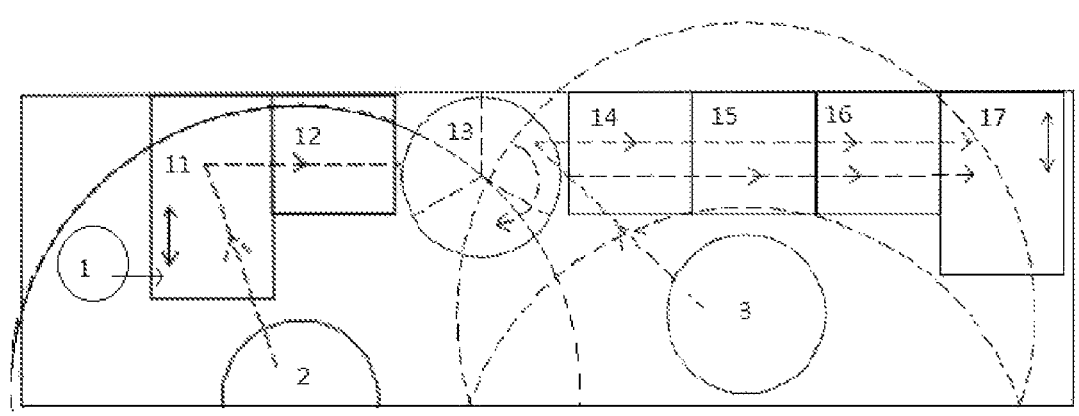
FIG. 2 is a schematic flow chart of an operation method of the assembly system for an automotive lamp according to FIG. 1.

Specifically, referring to FIG. 2 which is a schematic flow diagram of an operation method of the assembly system for automotive lamps according to FIG. 1 It can be seen from the figure that the operation method of the assembly system proposed in this embodiment specifically comprises the following steps:

The lamp housing transport and fastening station 11 transports an automotive lamp housing to be processed to a processing location at the lamp housing transport and fastening station 11, the glue-robot 1 moves to this location and dispenses glue to the lamp housing.

The lamp lens transport station 12 transports a lamp lens to be processed to a processing location at the lamp lens transport station 12, the lamp lens carrying robot 2 moves to this location, transports the lamp housing from the lamp lens transport station to the upper of the lamp housing at the lamp housing transport and fastening station 11, and fastens the lamp lens to the lamp housing.

The lamp housing transport and fastening station 11 fixedly connects the lamp housing and the lamp lens to form a whole lamp.

Next, the whole lamp carrying robot 3 moves to the lamp housing transport and fastening station 11 and moves the whole lamp to the whole lamp turnover station 13 to be subsequently processed.

Then, the whole lamp carrying robot 3 moves to the whole lamp turnover station 13 and carries the whole lamp from the whole lamp turnover station 13 to the first optical test position 14 or the first optical test position 15; the first optical test position 14 or the first optical test position 15 can perform optical test on the whole lamp and adjust the whole lamp based on the optical data obtained for better optical quality.

Then, the whole lamp carrying robot 3 moves to the first optical test station 14 or the second optical test station 15 and carries the tested whole lamp thereon to the whole lamp sealing performance test station 16; and the whole lamp sealing performance test station 16 conducts sealing performance test on the whole lamp.

Thereafter, the whole lamp carrying robot 3 moves to the whole lamp sealing performance test station 16 and carries the tested whole lamp thereon to the whole lamp transport station 17 to be unloaded.

It can be seen from the design of this embodiment that not only multiple functional robots are used for work coordination, the degree of automation of the assembly processes is also increased. Moreover, the whole lamp turnover station is added in this embodiment to enable the whole lamp integrated in the preceding process to wait at the whole lamp turnover station for a vacant station meant for a subsequent process, thereby avoiding process stoppage and the unnecessary occupation of various other functional stations or robots caused by operating rate differences between preceding process and subsequent process, and greatly improving the working efficiency of the assembly process. In addition, a whole lamp transport station is also provided in this embodiment to enable the whole lamp that has been tested to wait at the whole lamp transport station to be unloaded. This reduces the speed requirement for the unloading of the whole lamp and relieves the pressure of manual unloading, and especially it can prevent the equipment from having to go into standby mode due to worker absence.

In addition, in another preferred embodiment of the present invention, the glue-robot 1 is provided with a glue dispensing gun and a plasma processing unit, so that the glue-robot 1 can first perform surface treatment on the glue groove of the automotive lamp at the lamp housing transport and fastening station 11 and dispense glue thereafter. The specific processing steps include:

The plasma processing unit on the glue-robot 1 moves according to a preset route and performs surface treatment on the glue groove of the automotive lamp housing; then, the glue dispensing gun on the glue-robot 1 moves according to a preset route to fill glue into the cleaned glue groove of the lamp housing. Given that different movement routes can be set for the lamp housing carrying robot 9 based on the shape of the glue groove, the glue-robot of this embodiment can be used for lamp housings of different shapes.

In another preferred embodiment of the present invention, the lamp housing transport station 11 is provided with a nail gun and a positioning fixture, and the positioning fixture further includes a housing fixture and a locating pin, so as to position and fix the lamp housing placed at the lamp housing transport station 11 and to fix the fastened lamp housing and lamp lens by shooting nails into them. Therefore, it is ensured that the lamp housing does not undergo any displacement during the surface treatment, glue dispensing, lamp lens fastening and nailing processes, and the accuracy of various operations is ensured. The specific processing steps at the lamp housing transport station 11 include:

After the lamp housing is placed at the lamp housing transport station 11, the lamp housing is fixed by the housing fixture at the lamp housing transport station 11, and the locating pin of the positioning fixture is placed under the housing fixture to restrict the lamp housing. Once the lamp housing is transported to the processing position and the lamp lens is fastened, the nail gun at the lamp housing transport station 11 shoots nails into the preset positions of the fastened lamp housing and lamp lens to further fixedly connect the lamp housing and the lamp lens. In this way, the lamp housing and the lamp lens are further secured to prevent them from being separated.

In another preferred embodiment of the present invention, the whole lamp turnover station 13 includes a workpiece platform, and the workpiece platform includes at least one loading position or unloading position, and the workpiece platform rotates at a preset rate. The workpiece platform is provided with at least one loading position or unloading position, and the loading position or unloading position may be at the same spot or different spots. Accordingly, the lamp lens carrying robot 2 can place workpieces at the loading or unloading position, and the whole lamp carrying robot 3 can take workpieces from the loading or unloading position. For example, the workpiece platform may include three loading positions or unloading positions uniformly distributed thereon, where the lamp lens carrying robot 2 places a workpiece at the loading or unloading position once each time when the workpiece platform is rotated by ⅓ of its circumference. The whole lamp carrying robot 3 operates at a slower rate, such as picking a workpiece from the loading or unloading position once per one rotation of the workpiece platform, thereby effectively regulate the problem associated with operating rate differences between preceding process and subsequent process. The specific processing steps include:

The lamp lens carrying robot 2 carries the fastened and fixed whole lamp to the loading position of the whole lamp turnover station 13 at a first frequency; then, the whole lamp carrying robot 3 carries the whole lamp from the unloading position of the whole lamp turnover station 13 to the first optical test station 14 or the second optical test station 15 at a second frequency.

In another embodiment of the present invention, when carrying the whole lamp to the first optical test station 14 or the second optical test station 15, the whole lamp carrying robot 3 first detects whether a whole lamp is already present in the first optical test station 14 or the second optical test station 15, and places a new whole lamp to the first optical test station 14 or the second optical test station 15 without a whole lamp. In this embodiment, the use of two optical test stations to work alternately greatly improves the working efficiency of the assembly system and it helps to prevent the processing time of the entire assembly from being affected by the optical test duration.

In another embodiment of the present invention, the glue-robot 1 is provided with a gluing machine 18 disposed at the front thereof. In this embodiment, the glue-robot 1 can be set to periodically move to the gluing machine 18, allowing glue to be replenished to the glue dispensing gun of the glue-robot 1 through the gluing machine. Therefore, it is no longer necessary to manually judge the remainder of glue in the glue dispensing gun, and this can ensure that there is always enough glue in the glue dispensing gun and prevent substandard assembly caused by insufficiency of glue.

In summary, the present invention provides a more automated and integrated assembly system for automotive lamps. The assembly system uses three kinds of functional robots responsible for the transmission of workpieces between various functional stations to realize automatic gluing, fastening and whole lamp performance test, thereby reducing the amount of manual intervention and improving process integration. By providing a reasonable turnover area, the problem associated with waiting time caused by transmission rate differences between processes is regulated.

Figure 3:
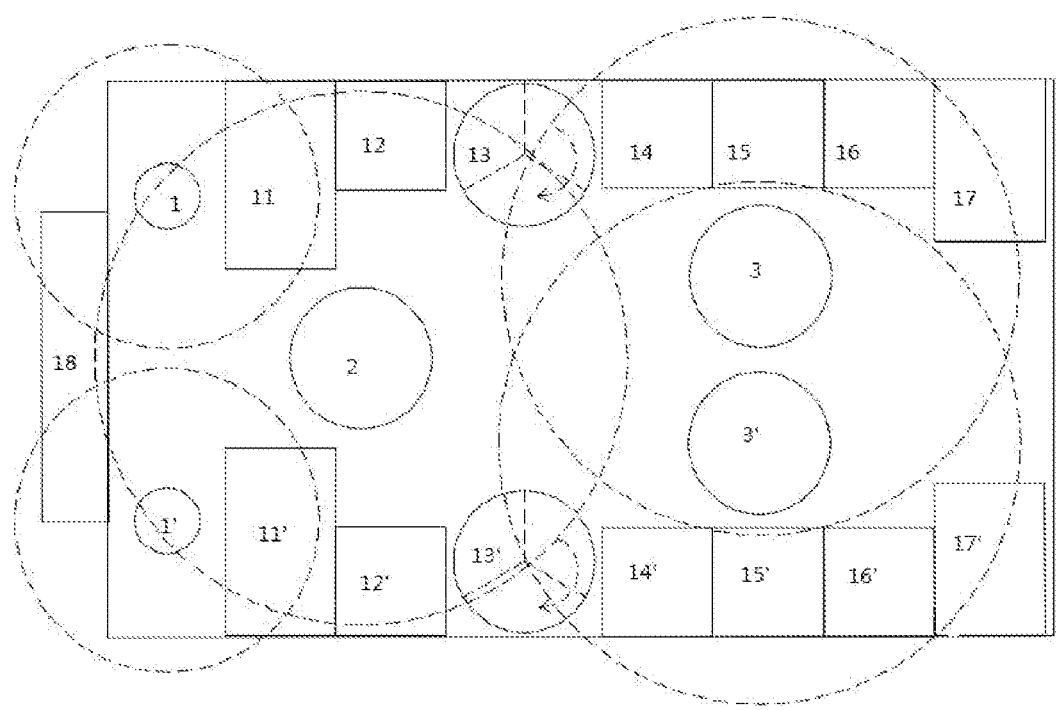
FIG. 3 is a schematic structural view of an assembly system for an automotive lamp in accordance with another preferred embodiment of the present invention.

Furthermore, the present invention also provides an assembly system with a two-sided assembly line operating simultaneously, which greatly improves the working efficiency of the lamp assembly. Specifically, referring to FIG. 3 which is a schematic structural view of an assembly system according to another preferred embodiment of the present invention. As can be seen from the figure, the assembly system in this embodiment includes a first assembly line and a second assembly line, each of which includes the assembly system in the earlier mentioned embodiments, and the first assembly line and the second assembly line are mirror-symmetrical. Moreover, the first and second assembly lines can operate according to the operation method of the earlier mentioned embodiments.

Alternatively, in another preferred embodiment of the present invention, an assembly system having the above-mentioned two-sided assembly line, of which the first assembly line and the second assembly line alternately share a lamp lens carrying robot, i.e. the lamp lens carrying robot first moves to an assembly line and moves a lamp lens and fastens it onto the lamp housing, transports the whole lamp obtained to the whole lamp turnover station; thereafter, the lamp lens carrying robot moves to another assembly line and moves a lamp lens and fastens it onto the lamp housing, and transports the whole lamp obtained to the whole lamp turnover station. Therefore, not only the utilization rate of the lamp lens carrying robot is improved, the problem associated with waiting time caused by processing rate differences between lamp lens fastening, fixedly connecting and subsequent whole lamp testing process during the assembly is also regulated.

In another preferred embodiment of the present invention, it is also possible for the two assembly lines to share one gluing machine, and the gluing machine simultaneously supplies glue to the glue dispensing guns of the two assembly lines, thereby avoiding the provision of two gluing machines which results in unnecessary space occupation and cost waste.

The specific embodiments of the present invention have been described in detail above only by way of example, and the invention is not limited to the specific embodiments described above. As will be understood by persons skilled in the art that any equivalent modifications and substitutions to the invention are within the scope of protection thereof. Accordingly, any equivalent changes and modifications made without departing from the spirit of the present invention shall fall with the scope thereof.

The invention claimed is:

1. An assembly system for automotive lamps comprising:
   a glue-robot having a glue dispensing gun;
   a lamp housing transport and fastening station including a nail gun and a positioning fixture;
   a lamp lens transport station;
   a whole lamp turnover station having a workpiece platform configured to rotate at a preset rate, the workpiece platform including a loading position and an unloading position;
   a first optical test station;
   a second optical test station;
   a whole lamp sealing performance test station;
   a whole lamp transport station, wherein the glue-robot, lamp housing transport and fastening station, lamp lens transport station, whole lamp turnover station, first optical test station, second optical test station, whole lamp sealing performance test station, and whole lamp transport station are disposed sequentially;
   a lamp lens carrying robot and a whole lamp carrying robot; a gluing machine configured to replenish glue for the glue-robot when the glue-robot moves to the gluing machine;
   wherein the lamp housing transport and fastening station, the lamp lens transport station and the whole lamp turnover station are located in a working area of the lamp lens carrying robot; and
   wherein the whole lamp turnover station, the first optical test station, the second optical test station, the whole lamp sealing performance test station and the whole lamp transport station are located in a working area of the whole lamp carrying robot.

2. The assembly system for automotive lamps as defined in claim 1, wherein the positioning fixture comprises a housing fixture and a locating pin.

3. An assembly system for automotive lamps, comprising a first assembly line and a second assembly line, wherein each of the first assembly line and the second assembly line comprises:
   a glue-robot having a glue dispensing gun;
   a lamp housing transport and fastening station including a nail gun and a positioning fixture;
   a lamp lens transport station;
   a whole lamp turnover station having a workpiece platform configured to rotate at a preset rate, the workpiece platform including a loading position and an unloading position;
   a first optical test station,
   a second optical test station,
   a whole lamp sealing performance test station,
   a whole lamp transport station, wherein the glue-robot, lamp housing transport and fastening station, lamp lens transport station, whole lamp turnover station, first optical test station, second optical test station, whole lamp sealing performance test station, and whole lamp transport station are disposed sequentially;
   a lamp lens carrying robot and a whole lamp carrying robot;
   a gluing machine configured to replenish glue for the glue-robot when the glue-robot moves to the gluing machine;
   wherein the lamp housing transport and fastening station, the lamp lens transport station and the whole lamp turnover station are located in a working area of the lamp lens carrying robot; and
   wherein the whole lamp turnover station, the first optical test station, the second optical test station, the whole lamp sealing performance test station and the whole lamp transport station are located in a working area of the whole lamp carrying robot.

4. The assembly system for automotive lamps as defined in claim 3, wherein the first assembly line and the second assembly line alternately share one lamp lens carrying robot.

\* \* \* \* \*